United States Patent [19]

Baumeister

[11] Patent Number: 4,553,175
[45] Date of Patent: Nov. 12, 1985

[54] METHOD/APPARATUS FOR PLAYBACK OF COLOR VIDEO STILL PICTURES FROM A MAGNETIC DISK

[75] Inventor: Hans-Peter Baumeister, Churchville, N.Y.

[73] Assignee: Eastman Kodak Company, Rochester, N.Y.

[21] Appl. No.: 571,035

[22] Filed: Jan. 16, 1984

[51] Int. Cl.[4] .............................................. H04N 5/781
[52] U.S. Cl. .................................................... 358/310
[58] Field of Search ............... 360/33.1; 358/342, 310, 358/330, 334, 324, 906

[56] References Cited

U.S. PATENT DOCUMENTS

| | | |
|---|---|---|
| 3,993,863 | 11/1976 | Leedom et al. . |
| 4,015,289 | 3/1977 | Kinjo et al. . |
| 4,183,059 | 1/1981 | Palmer . |
| 4,392,160 | 7/1983 | Minemura ............................ 358/330 |
| 4,399,472 | 8/1983 | Yamamoto et al. ................. 358/330 |
| 4,491,876 | 1/1985 | Aoike et al. .......................... 358/330 |

FOREIGN PATENT DOCUMENTS 2093254 8/1982 United Kingdom .
2097987 10/1982 United Kingdom .

OTHER PUBLICATIONS

"A New Small-Size Magnetic Disc Memory for Still Picture Recording," by K. Uno, et al., IEEE Trans. on Consumer Electronics, Nov. 1976, pp. 293-301.
Research Disclosure Item No. 22824.
Promotional literature on Panasonic's RECAM in-camera VTR system.

Primary Examiner—Donald McElheny, Jr.
Attorney, Agent, or Firm—David M. Woods

[57] ABSTRACT

Apparatus and method are disclosed for playing back a video signal representative of a still image. The video signal is recorded on a magnetic recording disk in the form of three separate signals on three respective tracks; a color component signal on a color track and two luminance component signals on two luminance tracks. The still image is reproduced by initially reading the color track with a playback head and storing the color component signal. Then the playback head is cycled back and forth between the two luminance tracks to read a continuous sequence of alternating first and second luminance component signals. The video signal is generated by repetitively combining each luminance component signal in the continuing sequence with the stored color component signal.

10 Claims, 3 Drawing Figures

METHOD/APPARATUS FOR PLAYBACK OF COLOR VIDEO STILL PICTURES FROM A MAGNETIC DISK

BACKGROUND OF THE INVENTION

1. Field of the Invention

This invention relates to improvements in the art of playing back a color video signal recorded in the form of separate luminance and color component signals on a recording medium, and is particularly adapted, though not exclusively so, to the playing back of such component signals derived from a still image and recorded on separate tracks on a pliable magnetic disk.

2. Description Relative to the Prior Art

In the video recording art, luminance and color component signals for a field of a video image are either recorded in combination on a single magnetic track or separately on two or more tracks, that is, two tracks if all the color is contained in one signal or more than two tracks if the color is split between several signals, for example, between red-luminance and blue-luminance signals. If the luminance and color component signals are recorded in combination on a single track, the color component signal is either placed in a vacant location in the frequency spectrum occupied by the video image or interleaved between the energy bands of the luminance component signal. Having the component signals on the same track often leads to undesirable effects. In particular, there is likely to be interference between the luminance and color component signals (often called luminance-to-chrominance crosstalk). Also, the bandwidth of the color component signal is necessarily reduced to fit within the recording spectrum.

Having the component signals on separate tracks provides the potential for superior color reproduction. Due to the physical separation of the component signals on the magnetic medium, the problem of interference between luminance and color component signals is practically eliminated. By taking advantage of the greater channel bandwidth made available by recording the color component signal on its own track, the color signal is considerably improved relative to noise.

Despite these advantages, devoting separate tracks to the luminance and color component signals introduces a number of complications into the playback procedure. These include the necessity of simultaneously generating the luminance and color component signals for a field of a video image and the accompanying necessity of processing the separate component signals in similar, parallel electronic circuits. This ordinarily means that a separate playback head must be used to read each component signal. A similar redundancy in the playback circuit is required to process all of the signals. Though simply reducing the number of heads and playback circuitry is a desirable economic objective, an equally important objective is to avoid an undesirable aerodynamic characteristic of a multi-head structure. Particularly as used with a pliable magnetic disk, the ganging together of several heads and flying these heads closely adjacent to the soft, flexible surface of the disk, leads to severe aerodynamic instability. This causes one or more of the heads to lose proper contact with the magnetic medium, thus distorting the reproduced signal and producing a defect in the reproduced image.

SUMMARY OF THE INVENTION

My invention reduces the number of heads required for playback of a multi-track recording and thereby avoids much of the signal distortion due to aerodynamic instability in the head-medium interface. In so doing, redundancy in the playback circuit is decreased. Apparatus and methods according to my invention are especially useful for playing back video signals representative of still images recorded on a re-circulating magnetic medium, such as a disk. A plurality of tracks on the disk are devoted to the signals representing each still picture, at least one track (color track) to the color component signal and at least one other track (luminance track) to the luminance component signal. The invention is practiced by using a head assembly that is adapted to locate adjacent the color track(s) first and the luminance track(s) second. Between times the color component signal recovered from the color track is stored in memory. The playback circuit combines the luminance component signal just read with the stored color component signal and provides the combined signal to a video display. Successive reproduction of the same picture—as is usual for still viewing—involves successively playing back the luminance component signal and successively combining it with the stored color component signal.

In a preferred embodiment, a single head is used to play back video signals recorded on three tracks for each video frame, that is, a separate track for the luminance component signal representing each field and a single track for the color component signal—representing either one or both of the fields. The color component signal is played back and stored; then the head is positioned over the first luminance track, from which the first luminance component signal is generated and combined with the stored color component signal. Then the head is positioned over the second luminance track, from which the second luminance component signal is read and combined with the stored color component signal. Then the head is repositioned over the first luminance track, which is played back; then over the second luminance track; then back over the first; and so on. In this manner the head is cycled back and forth between the luminance tracks for as long as the still picture is viewed.

BRIEF DESCRIPTION OF THE DRAWINGS

The invention will be described with reference to the figures, wherein.

DESCRIPTION OF THE PREFERRED EMBODIMENT

Figure 1:
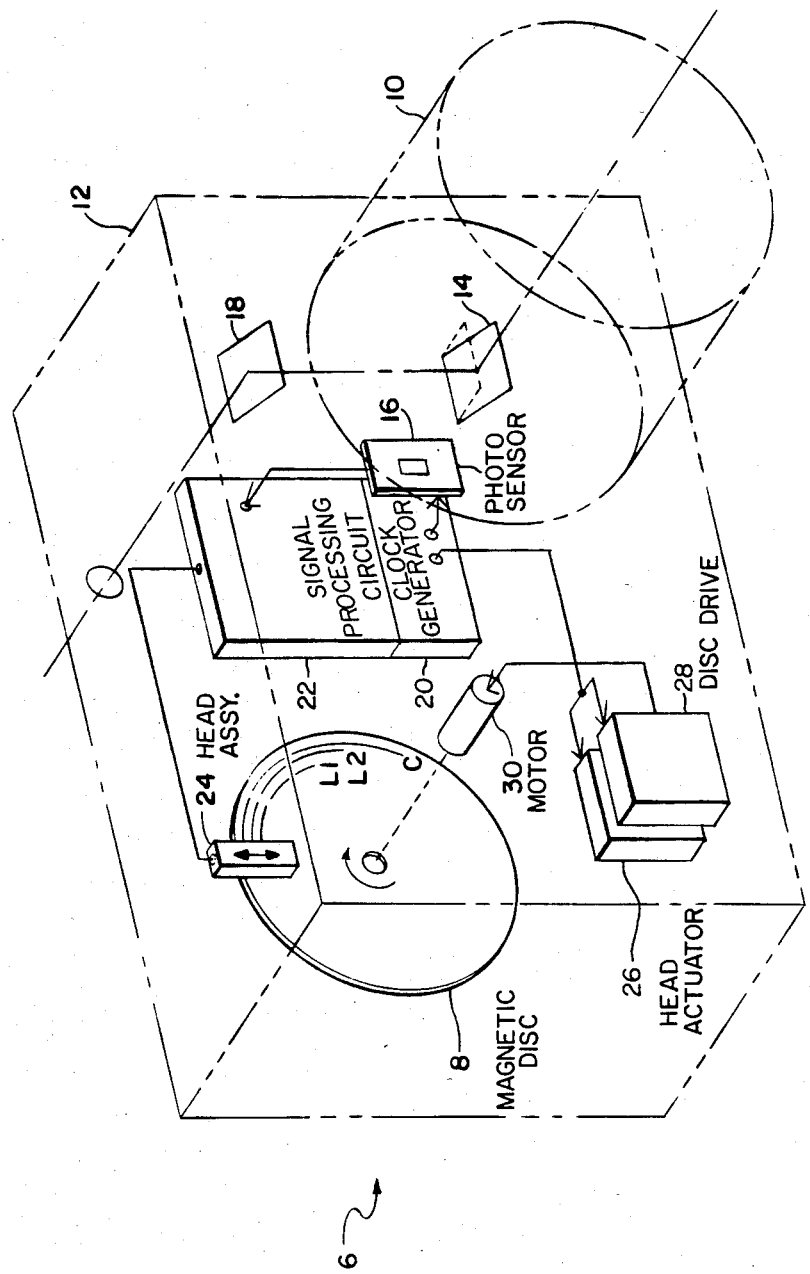
FIG. 1 is a perspective representation of an electronic camera capable of generating video signals corresponding to a still image and recording these signals upon a magnetic disk.
Figure 2:
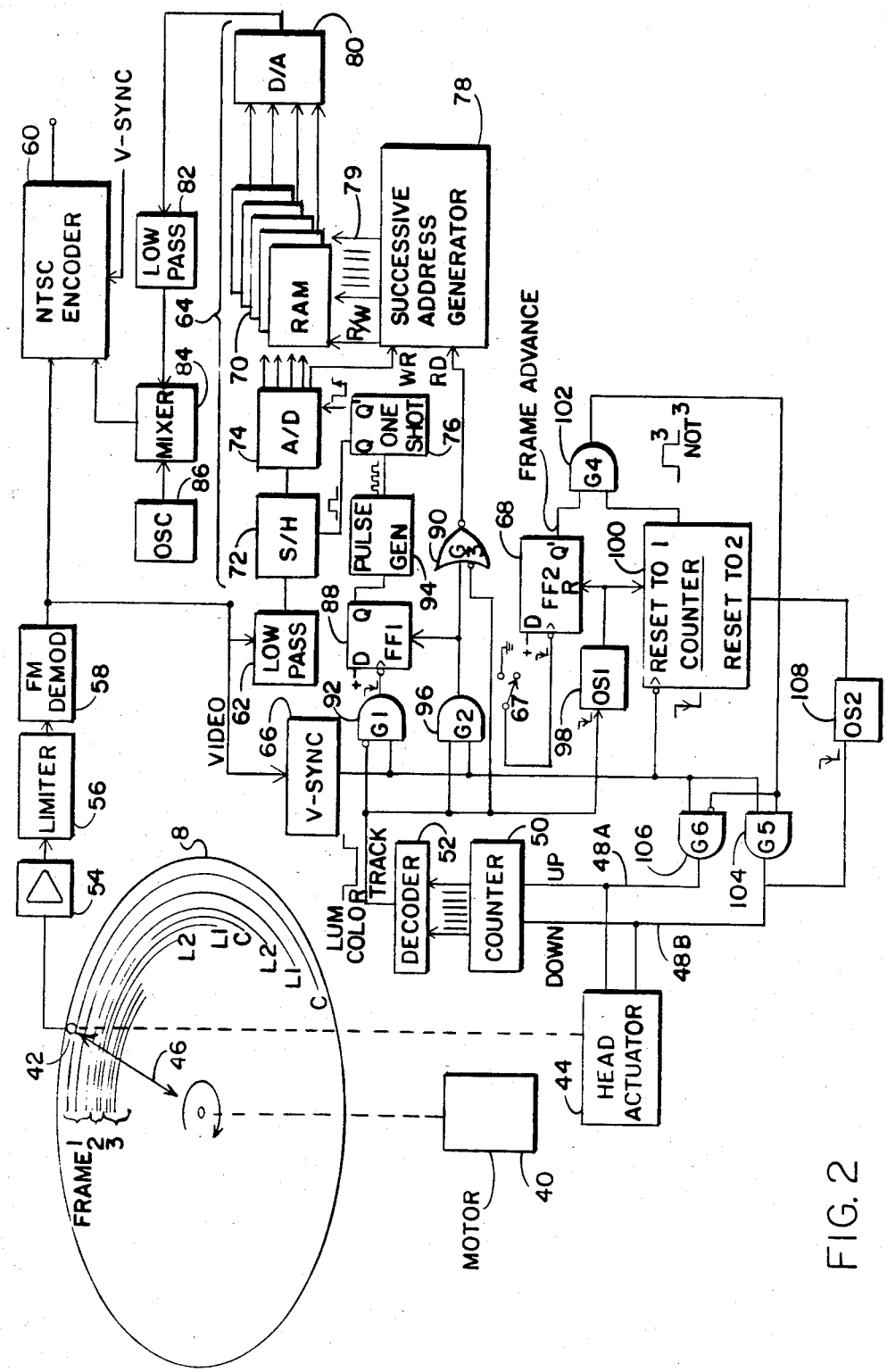
FIG. 2 is a block diagram of playback apparatus in accordance with the invention for playing back the signals recorded upon a disk of the type, and in the manner, shown by FIG. 1.
Figure 3:
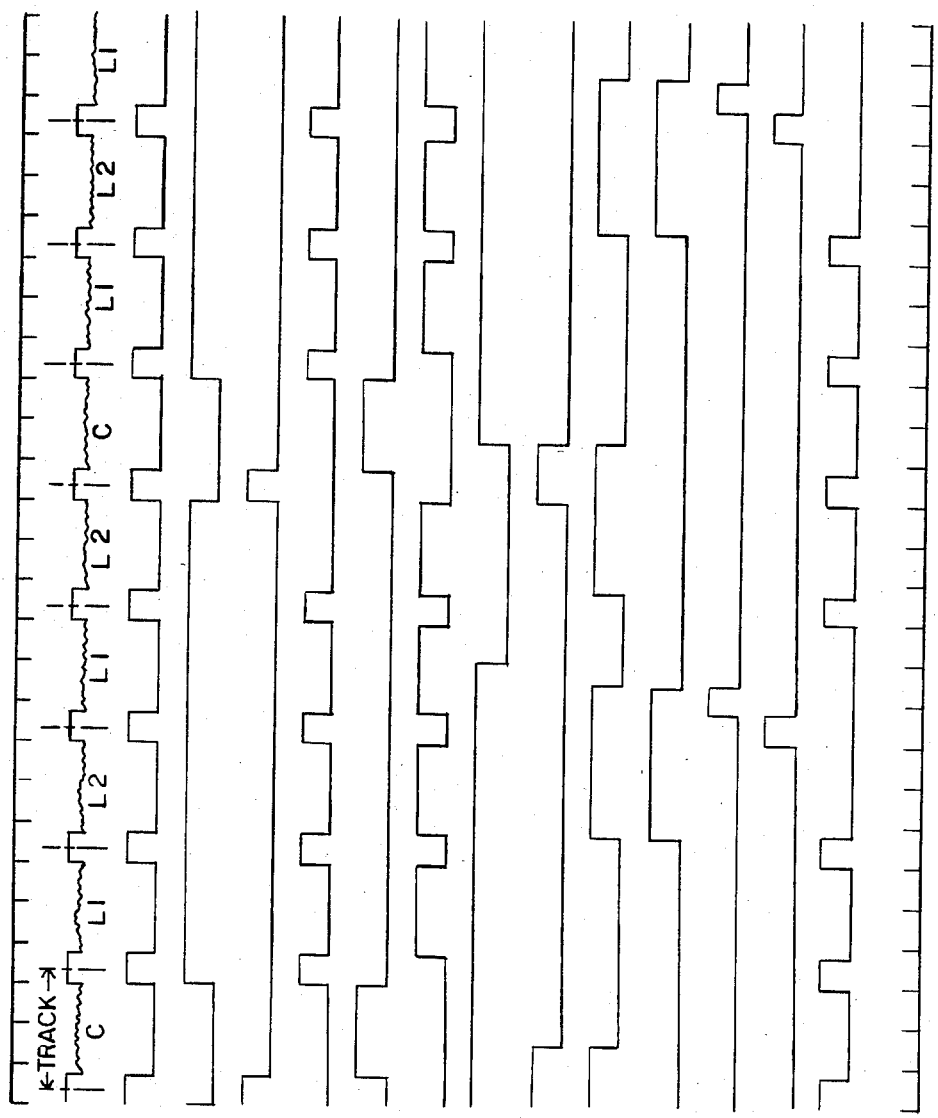
FIGS. 3A through 3N are waveform diagrams of signals at various points in the apparatus shown by block diagram in FIG. 2.

While the present invention is disclosed by reference to the playback apparatus shown by block diagram in FIG. 2 and the associated waveforms shown in FIG. 3, it is helpful in describing the invention to show a typical way of producing the video signals utilized by the playback apparatus. For this purpose FIG. 1 shows the parts of an electronic camera 6 which originate the signals recorded upon a magnetic disk 8. (The disk 8 is ordinarily protected by an enclosure or cassette, which is not shown in these figures.) The electronic camera includes a lens 10 mounted upon a camera body 12 (both shown in broken line). Behind the lens is a movable mirror 14 and a photosensitive element 16; the element 16 is disposed in the focal plane of the lens 10. The mirror 14 cooperates with a stationary mirror 18 to project a viewfinder image to an observer (not shown). When the movable mirror 14 is tilted up (as shown in broken line), the active part of the photosensitive element 16—for example, a conventional charge-coupled device—is exposed to incident illumination and an image-wise charge pattern is developed on its surface. A clock generator 20 provides a clocking signal for transferring a video signal—representative of an image-wise charge pattern—from the element 16 to a signal processing circuit 22.

The principal function of the circuit 22 is to form three separate video component signals for each picture, that is, a color component signal C for the whole picture area, a first luminance component signal L1 for a first partial area and a second luminance component signal L2 for a second partial area of the picture. As described herein, the whole picture area will be considered a video frame and each partial area a video field. The color signal C may represent one field of color information, an average of both fields, or some combination thereof. For purposes of this description, the color and luminance information is frequency modulated on respective carrier signals by the circuit 22 to form the three video component signals. The video component signals are provided to a movable head assembly 24, which records these three signals on three separate tracks for each video frame, i.e., for each still picture. One track (hereinafter referred to as the color track) contains the color component signal C of each frame; a second track (hereinafter referred to as the first luminance track) contains the first luminance component signal L1 for the first field; a third track (hereinafter referred to as the second luminance track) contains the second luminance component signal L2 for the second field of each frame.

The clock generator 20 is also connected to a head actuator 26 and a disk drive 28. The head actuator 26 moves the head assembly 24 from track to track while the disk drive 28 operates a motor 30 to turn the disk 8 at 60 revolutions per second, i.e., so that one field of video information can be recorded on each of the tracks on the disk 8. Sufficient tracks are provided for, say, twenty to forty complete pictures—or video frames—that is, 60 to 120 separate tracks. After a desired number of pictures are taken the disk 8 is removed from the camera 6 and inserted in suitable apparatus for playing back each picture.

FIG. 2 shows playback apparatus, according to the invention, for playing back the separate component signals from the magnetic disk 8 and generating a composite video signal suitable for use by an ordinary television receiver. Because the art of magnetic recording and playback is well known in general, and specifically in connection with magnetic disks, the present description will for the most part be directed to elements forming part of, or cooperating more directly with, the present invention. Playback elements not specifically shown or described in connection with FIG. 2 may be selected from those known in the art.

In the playback mode according to FIG. 2, the magnetic disk 8 is rotated at the field rate (60 Hz) by a servo-controlled motor 40. A single magnetic head 42 is positioned adjacent a particular magnetic track on the disk 8 by a head actuator 44. The head actuator 44 determines the radial translation of the head 42 (as indicated by the arrow 46) in response to forward and backward pulses received on respective input lines 48A and 48B. These pulses are also transmitted to the up/down input control lines of an up/down counter 50, which is preset to the beginning track number when the disk 8 is inserted into the playback apparatus. The counter 50 then counts up and down as the head moves forward and backward across the surface of the disk 8. The eight output lines of the counter 50 represent, in eight bits, the track number the head is reading. These eight bits form an eight-bit address to an 8-line decoder 52, which has a unique output line (or unique combination of output lines) for each track in the disk 8. All 8-bit addresses corresponding to tracks containing color component signals C are combined to form the output signal of the decoder 52. This signal, represented by the TRACK waveform shown by FIG. 3C, is HIGH for luminance tracks and is set LOW only for color tracks.

The playback head 42 follows each rapidly-moving disk track, senses the recorded FM signal and transmits it to the input of a high-gain playback preamplifier 54. The low-level FM signal is amplified and transmitted to the input of a FM limiter 56 which eliminates (clips) amplitude fluctuations, caused by variable head-to-tape contact, and extraneous signals and noise. Additional amplification can be provided at this point. The output from the limiter 56 is of a sufficient level to drive a FM demodulator 58, which removes the video intelligence from the FM carrier and produces a substantially noise-free output signal. The high-frequency signal components may also be de-emphasized at this point and further amplification may be provided. The video output signal from the demodulator 58 is provided on three separate lines to an NTSC encoder 60, a low pass filter 62 and a vertical-sync separator 66.

The basic operating procedure for the playback apparatus shown by FIG. 2 is to first read the color component signal C from a color track, and store this signal in a color memory 64. During subsequent revolutions of the disk 8, when the head is adjacent to the luminance tracks, the color data is recalled from the color memory 64 and alternately combined with the luminance component signal L1 from the first luminance track and then the luminance component signal L2 from the second luminance track. By stepping the head 42 back and forth between the luminance tracks, the luminance component signal from one or the other of the luminance tracks is continuously combined with the stored color component signal.

The timing for this procedure, expressed in detail by the signal waveforms shown by FIG. 3, basically derives from the V-SYNC waveform (FIG. 3B) of the signal generated by the vertical-sync separator 66, the TRACK waveform (FIG. 3C) of the signal generated by the decoder 52 and a FRAME ADVANCE waveform (FIG. 3H) of a signal generated by a flip-flop 68. (The names given to the waveforms of FIG. 3 agree with the named lines or elements in FIG. 2 where the respective waveforms are seen.) The vertical-sync separator 66 senses the vertical sychronization pulse at the beginning and end of each component signal, i.e., at the beginning and end of each track. As shown by the VIDEO waveform (FIG. 3A), the signal at the output of the FM demodulator 58 is a succession of component signals C, L1 and L2. Portions of the vertical synchronization pulse appear at each end of the VIDEO waveform for each track. The vertical sync separator 66 locks upon the vertical sync at the end of each track and holds its output high through the beginning of the vertical sync in the succeeding track. The TRACK waveform was heretofore discussed in connection with the decoder 52. The FRAME ADVANCE waveform (FIG. 3H) is responsive to an external selector switch 67 operated by a viewer to advance from one picture to the next.

The color memory 64, which may take a variety of conventional forms, is shown in FIG. 2 as a bit-plane memory array 70 composed of five 64K random access memories (RAMs) with input and output supporting peripherals for sampling, data conversion, and successive addressing. Since color contributes less to resolution in an image than luminance, color resolution can be sacrificed as long as full resolution in luminance is retained. This translates into fewer samples, and therefore less storage, than would ordinarily be necessary if a complete video field is contained within memory. In addition the bit resolution of each sample can be reduced. For instance, a 5-bit word is believed to be of sufficient resolution for representing color data from any sampled image element in the field. For a reduced field resolution of 175 samples/line (and 262.5 lines/field), the number of samples works out to be 46K. For 5-bit sample resolution, this requires 230K bits. The array of 64K RAMs therefore proves sufficient.

The band-limited signal from the low pass filter 62 is sampled by a sample/hold circuit 72. The samples are converted into 5-bit words by an analog-to-digital (A/D) converter 74. The sampling operation is controlled by a monostable (one-shot) multivibrator 76. When the Q output line of the one-shot 76 goes high the sample/hold circuit 72 samples the signal on its input line. Bringing the Q line low causes the sample to be held on the output line of the sample/hold circuit 72. The complementary Q' output line of the one-shot 76 controls the A/D conversion, causing the A/D converter to make the conversion on the rising edge of the waveform of the signal on the Q' line. The 5-bit word is put on the output lines of the A/D converter 74 and a write pulse WP is sent to a write control line of a successive address generator 78. The output lines of the A/D converter 74 connect with the data input lines of the memory array 70, thus making each 5-bit word available for storage.

A synchronous up/down counter (not shown separately) can be used as the generator 78 to produce successive addresses for the memory array 70. The combination of the RAMs and the up/down counter behaves like a shift register, with the shift controlled by the write control line. With each WR pulse on the write control line, the address generator 78 puts a read pulse out on the P/W control line and a storage address out on the address lines 79 of the memory array 70, which takes the 5-bit word on the memory array data input lines and enters the bits into a corresponding storage location. The address generator 78 then increments to the next successive address and waits for the next WR pulse. Reading data out of the memory array 70 is also controlled by the address generator 78. Reading, similar to writing, involves stepping through successive addresses. Upon receipt of a RD pulse, the data at a particular address location is put out to a digital-to-analog (D/A) converter 80, which converts the 5-bit word to its analog representation. This analog color component signal is filtered by a low pass filter 82 and heterodyned in a mixer 84 with a high frequency provided by the oscillator 86. The purpose of this section of the circuit is to generate a color subcarrier signal modulated by a chrominance signal according to the NTSC format.

The color data is written into the memory array 70 when the waveform FF1 of the output signal of a type-D flip-flop 88 is HIGH. This signal is generated as follows. An AND gate 92 couples the output lines of the vertical sync separator 66 and the decoder 52 to the clock input line of the type-D flip-flop 88. The output signal of the AND gate 92 is HIGH only if both of its input signals are HIGH, i.e., the G1 waveform (FIG. 3D) at the output of the gate 92 is HIGH only if the TRACK waveform (FIG. 3C) at the output of the decoder 52 is HIGH (after negation) and the V-SYNC waveform (FIG. 3B) at the output of the vertical sync separator 66 is HIGH. This condition obtains when the head 42 starts into a color track. The descending edge of the output signal, represented by waveform G1, of the gate 92 triggers the type-D flip-flop 88, thereby setting the Q output HIGH. The Q output line is coupled to the enable (ON) input line of a trigger pulse generator 94. When the enable input is HIGH the trigger pulse generator 94 turns on and produces regular trigger pulses for the one-shot 76. The first trigger pulse initiates the sampling of color data that is available at the input of the sample/hold circuit 72. Such sampling continues as long as trigger pulses are produced.

Sampling is discontinued by resetting the Q output of the flip-flop 88 LOW when the head 42 reaches the end of a color track. The LOW signal appearing on the Q output line of the flip-flop 88 turns off the trigger pulse generator 94. The flip-flop 88 is reset according to the condition, shown by waveform G2 (FIG. 3E), of an output signal of an AND gate 96. This output signal is HIGH, and therefore resets the flip-flop 88, only if both input signals are HIGH, i.e., the waveform G2 at the output of the gate 96 is HIGH only if the TRACK waveform (FIG. 3C) at the output of the decoder 52 is HIGH and the V-SYNC waveform (FIG. 3B) at the output of the vertical sync separator 66 is HIGH. This condition obtains just after the head 42 finishes reading the color data in a color track and begins to sense the vertical synchronization pulse at the end of the color track.

The color data is read out of the memory array 70 to the D/A converter 80 when the output signal of a NOR gate 90 is HIGH, putting a RD pulse on the read control line of the address generator 78. The output signal of the NOR gate 90 is generated as follows. The output lines of the AND gate 96 and the decoder 52 are both coupled to the input lines of the NOR gate 90. The waveform G3 (FIG. 3G) at the output of the NOR gate 90 is HIGH only if waveform G2 (FIG. 3E) at the output of the gate 96 is LOW and the waveform TRACK (FIG. 3C) at the output of the decoder 52 is HIGH. This condition obtains only when the head is reading a luminance component signal on either of the two luminance tracks and is between the vertical synchronization pulses at either end of each track.

The remainder of the block diagram shown by FIG. 2 is devoted to the generation of the forward and backward pulses provided to the head actuator 44 and the up/down counter 50. The output line from the decoder 52 is connected to the input line of a monostable (one-shot) multivibrator 98, which produces an output signal having the OS1 waveform shown by FIG. 3I. The one-shot 98 is triggered by bringing the signal on its input line LOW, that is, on the descending edge of the waveform TRACK (FIG. 3C). The output line of the one-shot 98 is connected to the reset line of the type-D flip-flop 68 and to the "reset to 1" line of a modulo-3 counter 100. The signal on the Q′ output line of the flip-flop 68, shown by waveform FRAME ADVANCE in FIG. 3H, is normally HIGH; it is only set LOW when the signal on its clock input line is brought LOW by the external selector switch 67. A viewer enables the switch 67 in order to advance the apparatus to the next picture. The clock input line to the modulo-3 counter is connected to the output line of the vertical sync separator 66. The modulo-3 counter 100 counts the vertical synchronization pulses and sets the signal on its output line HIGH on the descending edge of certain vertical synchronization pulses, as shown by the MODULO-3 waveform in FIG. 3J.

The Q′ output line of the flip-flop 68 and the output line of the modulo-3 counter 100 are connected to the input lines of an AND gate 102. The output signal of the gate 102 has the waveform G4 as shown by FIG. 3K. The waveform G4 is HIGH when the respective input signals are both HIGH, that is, when the waveform FRAME ADVANCE (FIG. 3H) of the output signal from the flip-flop 68 and the waveform MODULO-3 (FIG. 3J) of the output signal of the counter 100 are simultaneously HIGH. This condition will obtain only if the head 42 is advancing over the second luminance track and the switch 67 has not been enabled. Conversely, the waveform G4 is LOW when the output signal from either the flip-flop 68 or the modulo-3 counter 100 is LOW. The Q′ output signal of the flip-flop 68, shown by the waveform FRAME ADVANCE in FIG. 3H, is LOW when a viewer desires to see the next picture. The modulo-3 counter 100 is reset to 1 on the descending edge of the output signal—denoted by waveform OS1 in FIG. 3I—from the one-shot 98 after a count of 3 is reached and the head 42 is advancing toward a new frame. The counter 100 is reset to 2 on the descending edge of the output signal—denoted by waveform OS2 in FIG. 3L—from a one-shot 108. This condition occurs when the head 42 has just finished reading the second luminance track and the viewer wants to continue viewing the same frame.

The waveform G4 of the output signal from the AND gate 102 determines whether a forward or backward pulse will be provided to the head actuator 44 and the up/down counter 50. The output lines of the AND gate 102 and the vertical sync separator 66 are connected as shown by FIG. 2 to a pair of AND gates 104 and 106 (with the output signal from the gate 102 negated at its input to the gate 106). A forward pulse is put on the output line of the gate 106 when a vertical synchronization pulse is received simultaneously with a LOW output signal—denoted by waveform G4 (FIG. 3K)—from the AND gate 102. This condition obtains as the head 42 senses a vertical synchronization pulse at the end of any track and is ready to increment to the next track. A special occurrence of this condition is when the head 42 senses the vertical synchronization pulse on the second luminance track and a viewer has indicated (by bringing the FRAME ADVANCE signal LOW) that a new picture is to be viewed.

A backward pulse is put on the output line of the gate 104 when a vertical synchronization pulse is received simultaneously with a HIGH output signal—denoted by waveform G4—from the gate 102. This condition obtains only as the head senses a vertical synchronization pulse at the end of the second luminance track and the viewer is continuing to view the same picture (by leaving the FRAME ADVANCE signal HIGH). As long as the FRAME ADVANCE signal remains HIGH, a succession of forward and backward pulses will cause the head to step back and forth between the first and second luminance tracks. This repetitive sequence causes the head 42 to continually provide luminance component signals—from one or other of the luminance tracks—to the NTSC encoder 60. There, one or the other of the luminance signals is continuously combined with the stored color signal. The resultant color video signal is provided to a monitor or display (not shown), which generates a constant representation of a still color picture.

The head 42 is moved from one track to an adjacent track during the vertical blanking interval of the recorded video signal. For this purpose, the head actuator must be suitably configured to start the radial translation of the head 42 toward the adjacent track, complete the movement of the head between the tracks and dampen the radial movement of the head in the new track—all within the ½ to 1 millisecond allotted for the vertical blanking period. Various conventional head moving devices may be used. For example, U.S. Pat. No. 4,015,289 discloses a single step-driving device that intermittently steps the head from one track position to another track position on a rotating recording medium during a vertical blanking period. Other examples include a head arm with a coil on one end pivoted between two electromagnets (disclosed in U.K. Patent Application GB No. 2,097,987, published Nov. 10, 1982) and a head mounted on the armature of a spring-biased solenoid driver (disclosed in Research Disclosure, No. 22824, April 1983). Furthermore, a head arm attached to the voice coil of a common loudspeaker has been shown to provide the requisite track-to-track translation.

The embodiment heretofore described uses a single head to play back still pictures recorded on a magnetic disk. However the invention is broad enough to include variations upon this embodiment. A key aspect of the invention is the storage of the color component signal and the later combination of that signal with the luminance component signal. In systems permitting reduced resolution—such as single field display—all the color information is on one track and all the luminance information is on a second track. In accordance with the invention, a single magnetic head senses the color component signal, which is stored; then the head is stepped to the second track and senses the luminance component signal, which is combined with the stored color component signal. Apparatus for operating with two tracks is basically a simplified version of the apparatus shown by FIG. 2, a simplication that can be implemented by one of ordinary skill in this art.

Other systems may require high color resolution and two color tracks are provided as well as two luminance tracks. In that case, a single magnetic head steps from one color track over to the second color track. Both color component signals are stored separately in the memory array (which is suitably enlarged). The luminance component signals are read according to the teaching of the preferred embodiment and combined with the respective color component signals. Further digital elements will be required to properly sequence the color component signals. A circuit design including such elements is within the capability of one of ordinary skill in the video recording and playback arts.

In the example of a high color resolution system, a two head structure may provide a suitable compromise between aereodynamic instability and circuit logic. The two head structure is first positioned over the two color tracks. Without having to move the heads, the two color component signals are read—by means of suitable switching—and stored. The two head structure is then moved so as to overlie the two luminance tracks. The luminance component signals are alternately read—also without head movement by means of suitable switching—and combined with the respective color component signals to provide a continuous field output. The two head structure may also be applied to the three track system described in connection with the preferred embodiment. Only one head would be activated to read the color component signals while both heads would alternately read—also without head movement—the first and second luminance component signals. The substitution of a two head structure for the single head shown by FIG. 2 would require circuit changes that are well within the capability of one of ordinary skill in such systems.

The particular three-track configuration shown by FIGS. 1 and 2 includes, for each video frame, a color track C placed radially outward of the luminance tracks L1 and L2 on the magnetic disk 8. In other words, the order of reading the tracks is from the outward edge of the disk 8 to its center. The opposite configuration is also within the purview of the invention, that is, a color track C placed radially inward of the luminance tracks L1 and L2 for each frame. The order of reading would then be from the center of the magnetic disk 8 to its outward edge.

The invention has been described in detail with particular reference to a presently preferred embodiment thereof as well as reference to some variations, but it will be understood that other variations and modifications can be effected within the spirit and scope of the invention. For example, the recording medium has been described as a magnetic disk, in particular because the magnetic tracks on a disk are easily recirculated under the playback head assembly. Other type of media are also useful with the invention, for example, a magnetic drum.

What is claimed is:

1. Apparatus for playing back a color video signal composed of separate color and luminance component signals recorded on respective color and luminance tracks on a recording medium, said apparatus comprising:
    a playback head;
    means for positioning said head adjacent either the color track or the luminance track;
    means responsive to the position of said head adjacent the color track for reading the color component signal;
    means for storing the color component signal;
    means responsive to the position of said head adjacent the luminance track for reading the luminance component signal; and
    means for generating the color video signal from a combination of the stored color component signal and the luminance component signal.

2. Apparatus for playing back a color video signal composed of two or more color and luminance component signals recorded on two or more respective color and luminance tracks on a recording medium, said apparatus comprising:
    a playback head assembly including at least one playback head;
    means for positioning said head assembly adjacent either the color or luminance tracks;
    means responsive to the position of said head assembly adjacent a color track for reading a color component signal;
    a memory for storing the color component signal;
    means for entering the color component signal into said memory;
    means responsive to the position of said head assembly adjacent a luminance track for reading a luminance component signal; and
    means for generating a color video signal from a combination of the stored color component signal and the luminance component signal.

3. Apparatus as claimed in claim 2 wherein (a) the two or more component signals comprise a color component signal recorded on a color track and first and second luminance component signals recorded on first and second luminance tracks, (b) said means for positioning said head assembly positions said head assembly adjacent either the color track, the first luminance track or the second luminance track, (c) said means for reading a luminance component signal comprises means responsive to the position of said head assembly adjacent either the first luminance track or the second luminance track for reading either the first or second luminance signal, and (d) said means for generating a color video signal alternately combines the stored color component signal with the first luminance component signal and the second luminance component signal.

4. Apparatus as claimed in claim 3 wherein said means for generating a color video signal comprises means for continuously generating a color video signal from the same component signals by alternately combining the stored color component signal with the first luminance component signal and the second luminance component signal in a repetitive sequence.

5. Apparatus for playing back a video signal representative of a picture area and comprising at least one color and at least two luminance component signals recorded on at least three respective color and luminance magnetic tracks on a magnetic recording disk, said apparatus comprising:
    a playback head for sensing the signal recorded on each magnetic track;
    means for rotating the magnetic disk relative to said playback head;
    a positioner for locating said playback head adjacent any one of the color or luminance magnetic tracks;
    means responsive to the location of said playback head adjacent a color track for generating a color component signal representative of the picture area;
    means for storing the color component signal;
    means responsive to the location of said playback head adjacent a luminance track for generating a luminance component signal;

means for actuating said positioner to cycle said playback head back and forth across the luminance tracks so that said luminance component generating means provides a repetitive sequence of luminance component signals representative of the picture area; and means for generating the video signal representative of a picture area from the repetitive combination of the stored color component signal and an alternating sequence of the luminance component signals.

6. Apparatus as claimed in claim 5 wherein the magnetic disk includes additional groups of color and luminance magnetic tracks representative of additional picture areas, said apparatus further comprising a picture area selector for selecting the video signal corresponding to a particular picture area, said picture area selector including means for interrupting said actuating means so as to advance the playback head to some other group of tracks representative of some other picture area.

7. Apparatus for playing back a plurality of distinct video signals recorded on a magnetic recording disk, each video signal comprising a color and two luminance component signals representative of a still image and recorded on three respective color and luminance magnetic tracks on the disk, said apparatus comprising:

means including a single magnetic head for sensing the signal recorded on each magnetic track;

means for orienting said sensing means relative to the color and luminance magnetic tracks representative of a selected still image;

means responsive to the orientation of said sensing means adjacent a color track for generating the color component signal;

means for storing said color component signal in a memory;

means responsive to the orientation of said sensing means adjacent a luminance track for generating the luminance component signal;

means for moving said sensing means radially inward and outward between the two luminance tracks so as to generate a repetitive sequence of first and second luminance component signals; and means for generating a video signal representative of said selected still image from the combination of the stored color component signal and the repetitive sequence of luminance component signals.

8. A method for playing back a color video signal representative of a picture area, said signal composed of separate color and luminance component signals recorded on respective color and luminance tracks on a re-circulating recording medium, said method comprising the steps of:

reading the color component signal representative of a picture area by positioning a playback head adjacent a color track;

storing the color component signal;

reading the luminance component signal representative of a picture area by positioning the playback head adjacent a luminance track;

re-circulating the recording medium so that a sequence of luminance component signals are repetitively read from the luminance track; and continuously combining the stored color component signal with the sequence of luminance component signals to form the color video signal representative of the picture area.

9. A method for playing back color video signals representative of a plurality of picture areas, each video signal composed of one color and two luminance component signals recorded on three separate color and luminance magnetic tracks on a magnetic recording disk, said method comprising the steps of:

selecting a particular set of magnetic tracks representative of a particular picture area;

rotating the magnetic disk adjacent a playback head;

reading the color component signal representative of the particular picture area by positioning the playback head adjacent the color track;

storing the color component signal;

reading the first luminance component signal by positioning the playback head adjacent the first luminance track;

reading the second luminance component signal by positioning the playback head adjacent the second luminance track; and generating the video signal representative of a particular picture area by combining the stored color component signal with the first and second luminance component signals.

10. The method as claimed in claim 9 wherein the steps of reading the luminance component signals further comprise continuously cycling the playback head back and forth between the first and second luminance tracks in order to generate an alternating sequence of first and second luminance component signals and the step of generating the video signal further comprises continuously combining the stored color component signal with the sequence of luminance component signals.

* * * * *